US012646267B2

(12) United States Patent
McIlree et al.

(10) Patent No.: US 12,646,267 B2
(45) Date of Patent: Jun. 2, 2026

(54) COMPOSITING OF IMAGES FROM VIRTUAL AND PHYSICAL CAMERAS

(71) Applicant: Apple Inc., Cupertino, CA (US)

(72) Inventors: James C. McIlree, Santa Clara, CA (US); Jacob Wilson, San Francisco, CA (US); Courtland M. Idstrom, Cupertino, CA (US); Maneli Noorkami, Menlo Park, CA (US); Michael A. Glass, Nyack, NY (US); Travis W. Brown, Boulder, CO (US); Afshin Taghavi Nasrabadi, Los Gatos, CA (US); Yi Zhou, Sunnyvale, CA (US); Jérôme Decoodt, L'Étang-la-Ville (FR)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 18/508,175

(22) Filed: Nov. 13, 2023

(65) Prior Publication Data

US 2024/0404213 A1 Dec. 5, 2024

Related U.S. Application Data

(60) Provisional application No. 63/470,970, filed on Jun. 4, 2023.

(51) Int. Cl.
*G06T 19/00* (2011.01)
*G06T 5/50* (2006.01)

(52) U.S. Cl.
CPC .............. *G06T 19/006* (2013.01); *G06T 5/50* (2013.01); *G06T 2207/20221* (2013.01)

(58) Field of Classification Search
None
See application file for complete search history.

(56) References Cited

U.S. PATENT DOCUMENTS

2021/0074014 A1* 3/2021 Kerr .......................... G06T 7/70

FOREIGN PATENT DOCUMENTS

GB 2586831 A * 3/2021 ........... G11B 27/031

* cited by examiner

*Primary Examiner* — Tapas Mazumder
(74) *Attorney, Agent, or Firm* — BAKERHOSTETLER

(57) ABSTRACT

A device may include a processor configured to determine a first position of a physical camera in a physical environment, transmit the first position to a second device, obtain metadata of the physical camera, and cause a modification of a virtual camera of the second device based on the metadata. The processor is also configured to obtain, from the second device, at least one virtual image frame captured by the virtual camera placed at a second position in a computer-generated environment, and to obtain, from the physical camera, at least one image frame captured from the physical environment. The processor is also configured to generate a composite image frame including at least a portion of at least one virtual image frame composited with at least a portion of the at least one image frame, and display the composite image frame.

21 Claims, 8 Drawing Sheets

300

302 — DETERMINE A FIRST POSITION OF A PHYSICAL CAMERA IN A PHYSICAL ENVIRONMENT

304 — TRANSMIT, TO THE SECOND DEVICE, THE FIRST POSITION

306 — OBTAIN METADATA OF THE PHYSICAL CAMERA, WHEREIN THE METADATA COMPRISES ONE OR MORE INTRINSIC ATTRIBUTES OF THE PHYSICAL CAMERA

308 — CAUSE A MODIFICATION OF A VIRTUAL CAMERA OF THE SECOND DEVICE BASED ON THE METADATA

310 — OBTAIN, FROM THE SECOND DEVICE, AT LEAST ONE VIRTUAL IMAGE FRAME CAPTURED BY THE VIRTUAL CAMERA PLACED AT A SECOND POSITION IN A COMPUTER-GENERATED ENVIRONMENT

312 — OBTAIN, FROM THE PHYSICAL CAMERA, AT LEAST ONE IMAGE FRAME CAPTURED FROM THE PHYSICAL ENVIRONMENT, THE AT LEAST ONE IMAGE FRAME INCLUDING A SUBJECT IN THE PHYSICAL ENVIRONMENT

314 — GENERATE A COMPOSITE IMAGE FRAME BASED ON COMPRISING AT LEAST A PORTION OF THE AT LEAST ONE VIRTUAL IMAGE FRAME COMPOSITED WITH AT LEAST A PORTION OF AND THE SUBJECT OF THE AT LEAST ONE IMAGE FRAME

316 — DISPLAY THE COMPOSITE IMAGE FRAME

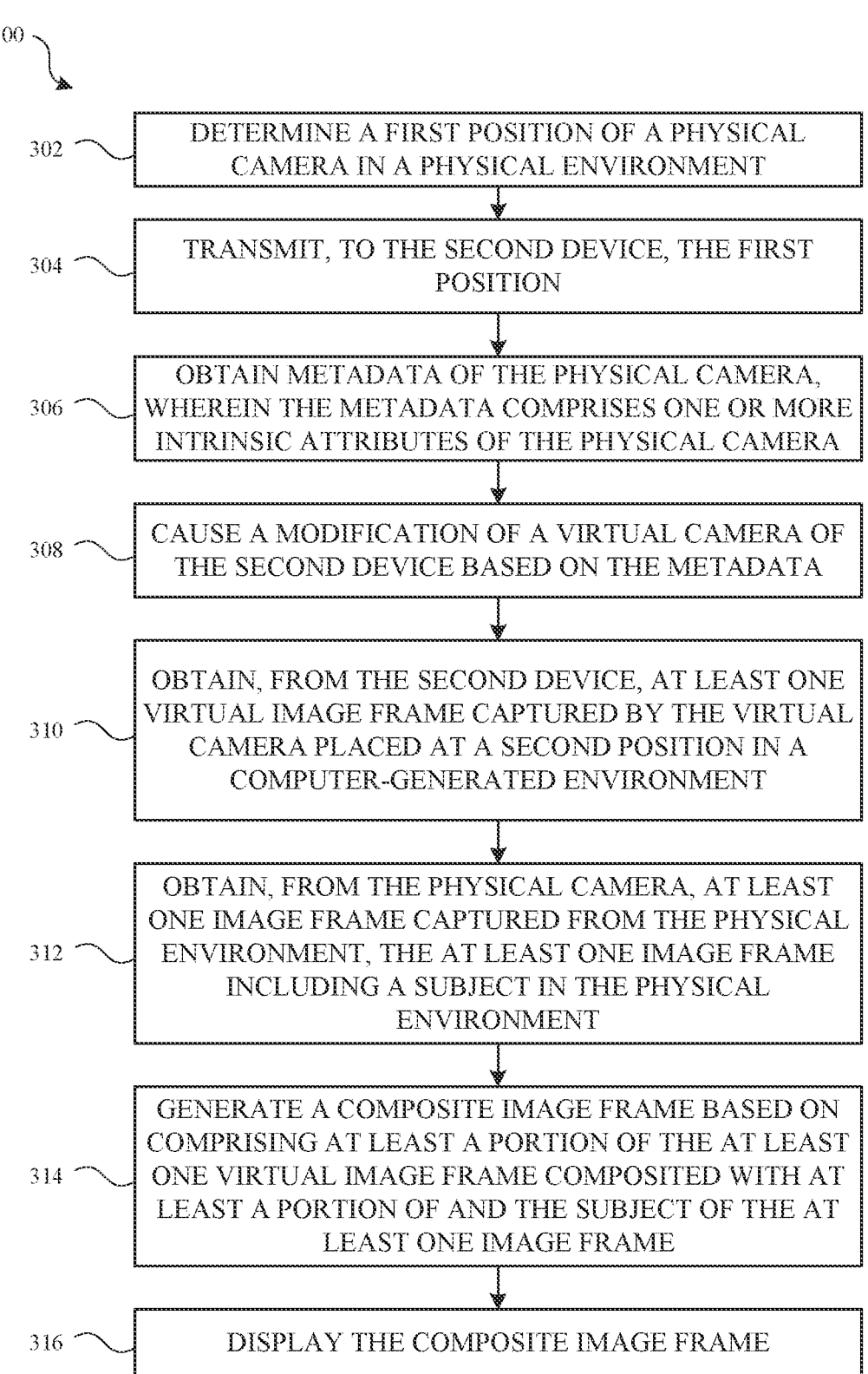

300

302 — DETERMINE A FIRST POSITION OF A PHYSICAL CAMERA IN A PHYSICAL ENVIRONMENT

304 — TRANSMIT, TO THE SECOND DEVICE, THE FIRST POSITION

306 — OBTAIN METADATA OF THE PHYSICAL CAMERA, WHEREIN THE METADATA COMPRISES ONE OR MORE INTRINSIC ATTRIBUTES OF THE PHYSICAL CAMERA

308 — CAUSE A MODIFICATION OF A VIRTUAL CAMERA OF THE SECOND DEVICE BASED ON THE METADATA

310 — OBTAIN, FROM THE SECOND DEVICE, AT LEAST ONE VIRTUAL IMAGE FRAME CAPTURED BY THE VIRTUAL CAMERA PLACED AT A SECOND POSITION IN A COMPUTER-GENERATED ENVIRONMENT

312 — OBTAIN, FROM THE PHYSICAL CAMERA, AT LEAST ONE IMAGE FRAME CAPTURED FROM THE PHYSICAL ENVIRONMENT, THE AT LEAST ONE IMAGE FRAME INCLUDING A SUBJECT IN THE PHYSICAL ENVIRONMENT

314 — GENERATE A COMPOSITE IMAGE FRAME BASED ON COMPRISING AT LEAST A PORTION OF THE AT LEAST ONE VIRTUAL IMAGE FRAME COMPOSITED WITH AT LEAST A PORTION OF AND THE SUBJECT OF THE AT LEAST ONE IMAGE FRAME

316 — DISPLAY THE COMPOSITE IMAGE FRAME

*FIG. 3*

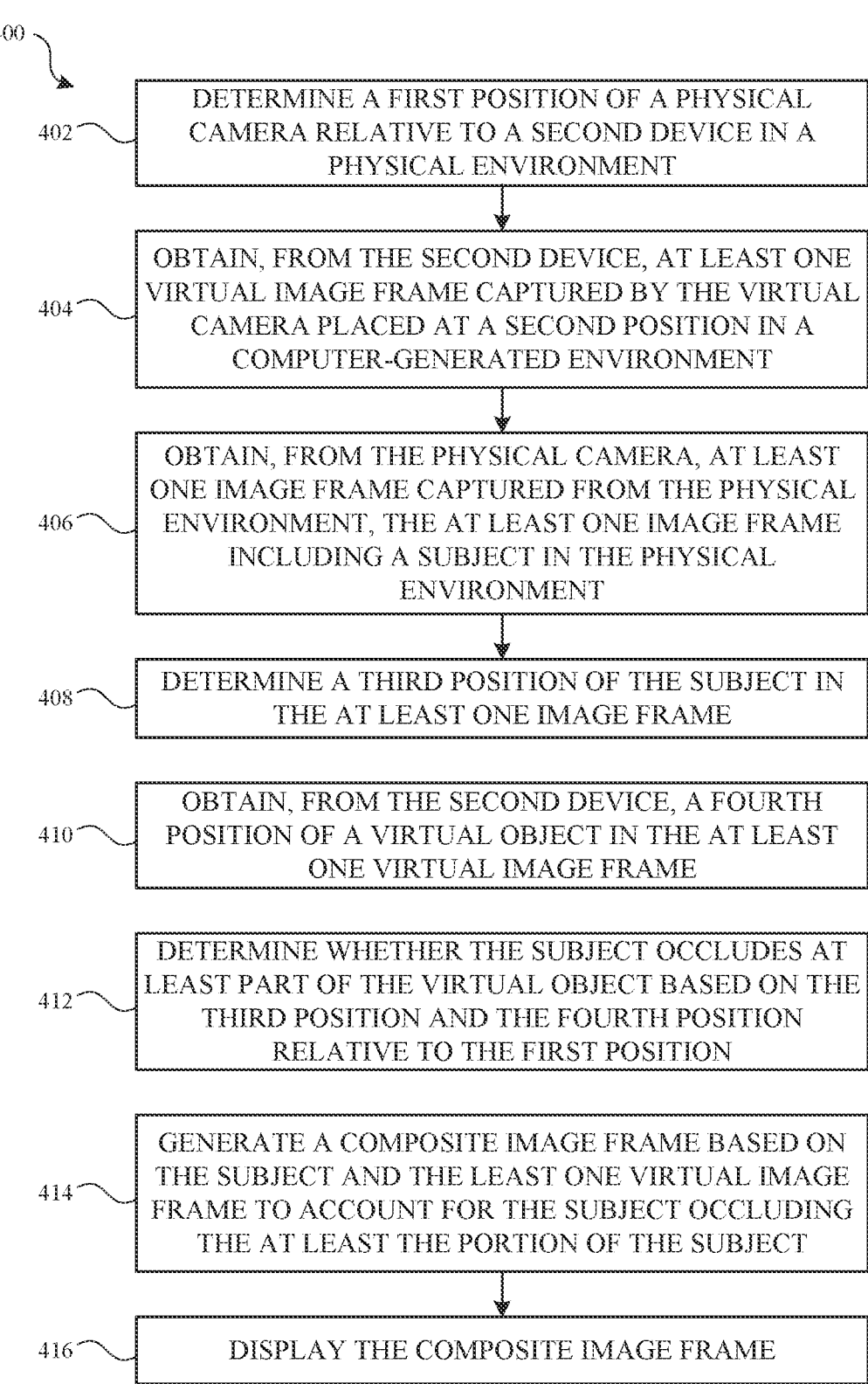

400

402 — DETERMINE A FIRST POSITION OF A PHYSICAL CAMERA RELATIVE TO A SECOND DEVICE IN A PHYSICAL ENVIRONMENT

404 — OBTAIN, FROM THE SECOND DEVICE, AT LEAST ONE VIRTUAL IMAGE FRAME CAPTURED BY THE VIRTUAL CAMERA PLACED AT A SECOND POSITION IN A COMPUTER-GENERATED ENVIRONMENT

406 — OBTAIN, FROM THE PHYSICAL CAMERA, AT LEAST ONE IMAGE FRAME CAPTURED FROM THE PHYSICAL ENVIRONMENT, THE AT LEAST ONE IMAGE FRAME INCLUDING A SUBJECT IN THE PHYSICAL ENVIRONMENT

408 — DETERMINE A THIRD POSITION OF THE SUBJECT IN THE AT LEAST ONE IMAGE FRAME

410 — OBTAIN, FROM THE SECOND DEVICE, A FOURTH POSITION OF A VIRTUAL OBJECT IN THE AT LEAST ONE VIRTUAL IMAGE FRAME

412 — DETERMINE WHETHER THE SUBJECT OCCLUDES AT LEAST PART OF THE VIRTUAL OBJECT BASED ON THE THIRD POSITION AND THE FOURTH POSITION RELATIVE TO THE FIRST POSITION

414 — GENERATE A COMPOSITE IMAGE FRAME BASED ON THE SUBJECT AND THE LEAST ONE VIRTUAL IMAGE FRAME TO ACCOUNT FOR THE SUBJECT OCCLUDING THE AT LEAST THE PORTION OF THE SUBJECT

416 — DISPLAY THE COMPOSITE IMAGE FRAME

*FIG. 4*

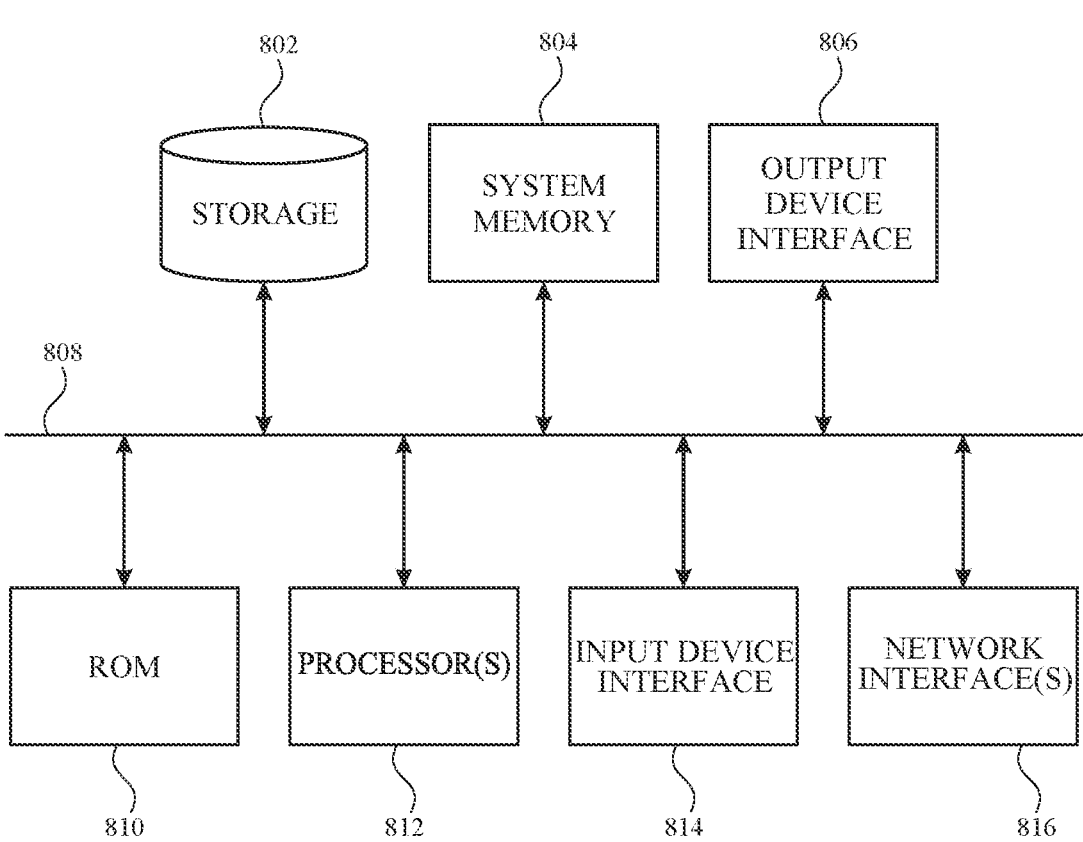
*FIG. 8*

COMPOSITING OF IMAGES FROM VIRTUAL AND PHYSICAL CAMERAS

CROSS-REFERENCE TO RELATED APPLICATIONS

The present application claims the benefit of U.S. Provisional Patent Application Ser. No. 63/470,970, entitled "COMPOSITING OF IMAGES FROM VIRTUAL AND PHYSICAL CAMERAS," filed Jun. 4, 2023, which is hereby incorporated herein by reference in its entirety and made part of the present U.S. Utility Patent Application for all purposes.

TECHNICAL FIELD

The present description relates generally to computer-generated reality recording, including positional synchronization, or positional alignment, of virtual and physical cameras for generating a composite computer-generated reality recording.

BACKGROUND

Augmented reality technology aims to bridge a gap between computer-generated environments and a physical environment by providing an enhanced physical environment that is augmented with electronic information. As a result, the electronic information appears to be part of the physical environment as perceived by a user. In an example, augmented reality technology further provides a user interface to interact with the electronic information that is overlaid in the enhanced physical environment.

BRIEF DESCRIPTION OF THE DRAWINGS

Certain features of the subject technology are set forth in the appended claims. However, for purpose of explanation, several embodiments of the subject technology are set forth in the following figures.

FIG. 3 illustrates a flow diagram of an example process for synchronizing configurations between a virtual camera and a physical camera in accordance with one or more implementations.

FIG. 4 illustrates a flow diagram of an example process for excluding occluding objects from composite image frames in accordance with one or more implementations.

FIG. 8 illustrates an example electronic system with which aspects of the subject technology may be implemented in accordance with one or more implementations.

DETAILED DESCRIPTION

Figure 1:
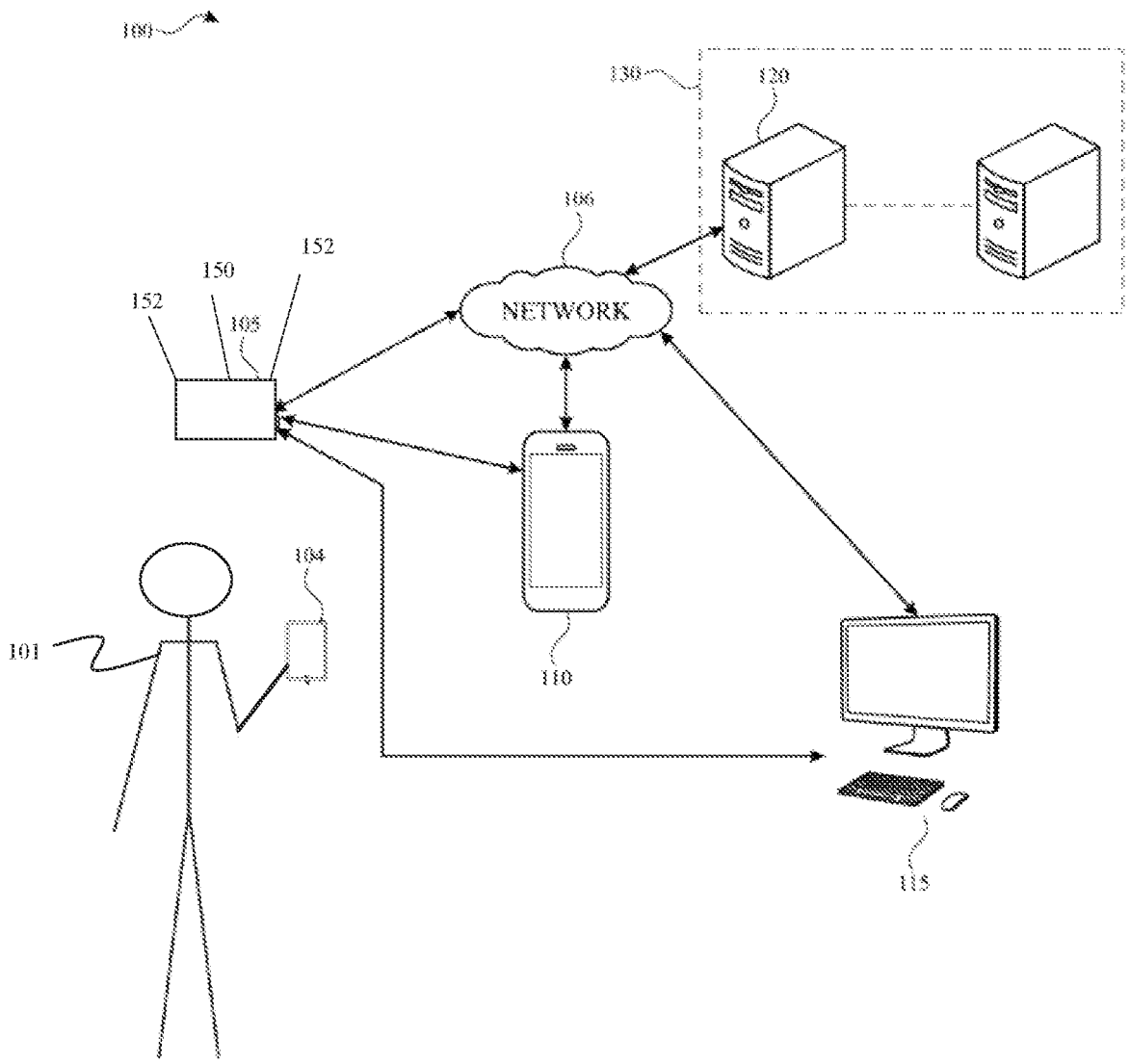
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A challenge faced in augmented reality technology is the generation of recordings, from the perspective of a third person, of a physical environment that is being augmented with electronic information for a user. For example, one or more images of a user in a physical environment may be captured by one or more physical cameras while one or more images of the electronic information may be captured by one or more virtual cameras. However, in many instances, images captured from the physical cameras and/or the virtual cameras may not adequately reflect the augmented reality environment as perceived by a user via, e.g., a mixed reality headset. The inadequacy may be due to factors including differences between the intrinsic and/or extrinsic attributes of the physical and virtual cameras, inadequate synchronization between physical and virtual cameras, occlusion of electronic information by the physical environment, and the like.

Aspects of the subject technology address such challenges by enabling real-time or near real-time compositing of images from virtual and physical cameras to more accurately portray an augmented reality experience from a third person perspective. In some aspects, the virtual and physical cameras may synchronize information (e.g., extrinsic and/or intrinsic attributes) such that changes in the physical camera (e.g., position or field of view) may similarly be reflected in the virtual camera, and vice versa. In some aspects, the images from the virtual and physical cameras may be associated with depth information to detect occlusion (e.g., by the physical environment) for generating composite images that accurately portray the position of the electronic information in the physical environment. In this manner, virtual camera images may be dynamically generated, accommodating movements of both physical and virtual cameras, and offering a range of perspectives, thus delivering a more precise representation of the user's experience within the enhanced physical environment.

As discussed herein, a computer-generated reality (CGR) system refers to a system that enables physical and virtual environments to be combined in varying degrees to facilitate interactions from a user in a real-time manner. Such a CGR system, as described herein, therefore can include various possible combinations of physical and virtual environments, including augmented reality that primarily includes physical elements and is closer to a physical environment than a virtual environment (e.g., without physical elements). In this manner, a physical environment can be connected with a virtual environment by the CGR system. A user immersed in an CGR environment can navigate through such an environment and the CGR system can track the user's viewpoint to provide a visualization based on how the user is situated in the environment A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's body and/or head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and a virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over a portion of the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over a portion of the physical environment and/or behind a portion of the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include mobile devices, tablet devices, projection-based systems, heads-up displays (HUDs), head mounted systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets or tablet devices, and desktop/laptop computers. For example, a head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A CGR system enables physical and computer-generated environments to be combined in varying degrees to facilitate interactions from a user in a real-time (or substantially real-time) manner. Such a CGR system, as described herein, therefore can include various possible combinations of physical and computer-generated environments. In this manner, a physical environment can be connected with a computer-generated environment by the CGR system. A user immersed in a computer-generated environment (e.g., via an electronic device) can navigate through such an environment and the system can track the user's viewpoint to provide a visualization based on how the user is situated in the environment. The user may be represented in the computer-generated environment by, for example, an avatar.

Virtual cameras can be positioned throughout the computer-generated environment to capture virtual images and/or videos of the user's avatar's movement throughout the computer-generated environment, while physical cameras (e.g., image capture devices) can be positioned throughout a physical environment surrounding the user to capture images and/or videos of the surrounding physical environment. The subject system facilitates positional synchronization of the virtual and physical cameras relative to the user's avatar in the computer-generated environment, and the user in the physical environment, such that virtual images captured by the virtual camera are positionally aligned, and/or perspective aligned, with physical images captured by the physical camera. In this manner, the positionally aligned, and/or perspective aligned, virtual and physical images can be composited to generate computer-generated reality images and/or recordings.

For example, the subject system can facilitate a user with synchronizing a field of view of a physical camera capturing images/video of the user's movement in a physical environment with a position of a virtual camera that is concurrently capturing virtual images/video of the user's avatar's movement in a computer-generated environment. In this manner, images/video of the user can be segmented from the images/video captured from the physical environment, and can be composited with the virtual images/video to generate a computer-generated reality image/recording in which the user's avatar is replaced with the images of the user in the physical environment.

In one or more implementations, the subject system may perform the compositing in real-time and may display the composited output on a preview display, e.g., of the physical camera. In this manner, the preview display can display to a viewer (e.g., a director) the video of the physical body of the user captured by the physical camera superimposed over the virtual video of the computer-generated environment captured by the virtual camera, where movements of the physical camera (e.g., panning, zooming, etc.) are synchronized with and/or mirrored by the virtual camera such that the viewer can frame shots that include both the physical body of the user and the computer-generated environment.

The subject system can also be used to enable another user's device, such as a mobile device or tablet, to operate as a viewport into a CGR environment being experienced by the user using and/or wearing the electronic device. For example, the subject system can place a virtual camera in the CGR environment at a position that is synchronized with the position of the other user's device in the physical environment. Virtual objects can then be segmented from the virtual images and composited with physical images that are being concurrently captured by the physical camera of the other user's device to provide the other user with a viewport into the CGR environment being experienced by the user.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a handheld and/or mobile device, or as a head mounted portable system (e.g., worn by a user 101). The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a tablet, watch, mobile device, and the like.

The electronic device 105 may include one or more cameras such as camera(s) 150 (e.g., visible light cameras, infrared cameras, etc.). Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for performing one or more actions, such as initiating video capture of physical and/or virtual content. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the computer-generated reality environment. Examples of such events include detecting a presence of a particular person, entity, or object in the scene. In response to the detected event, the electronic device 105 can provide annotations (e.g., in the form of metadata) in the computer-generated reality environment corresponding to the detected event.

The network 106 may communicatively (directly or indirectly) couple, for example, the electronic device 104, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 8. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server that stores any of the aforementioned computer-generated reality content generated by the above-discussed devices and/or the server 120.

In one or more implementations discussed further below with respect to FIGS. 3 and 4, a user utilizing the electronic device 105, and/or utilizing the electronic device 104, to access a computer-generated reality environment may wish to generate a recording that merges images of their body in the physical environment with virtual image frames (e.g., a virtual video) generated from the computer-generated environment and/or computer-generated reality environment being provided by the electronic device 105. However, in order to composite the images of the user's body onto the virtual image frames, one or more attributes (e.g., field of view, position, and the like) of the physical camera capturing images the user's body in the physical environment (e.g., the electronic device 110) may need to be synchronized (e.g., aligned) with the attributes of the virtual camera generating the virtual image frames from the computer-generated environment.

In one or more implementations, a user using and/or wearing the electronic device to experience a computer-generated reality environment may wish to generate a computer-generated reality image of themselves in the computer-generated reality environment (e.g., a computer-generated reality "selfie") that includes an image of their physical body from the physical environment composited with the computer-generated reality environment they are experiencing. However, in order for an image captured from the physical environment to be aligned with a virtual image generated from the computer-generated environment, the subject system modifies one or more attributes of the virtual camera in the computer-generated environment that is complementary to the physical camera in the physical environment, such that the image frames from the physical camera can be composited with the virtual image frames from the virtual camera In some implementations, the subject system also or instead identifies and removes occluding objects from the composited images.

For explanatory purposes, the subject system is described herein with respect to one virtual camera and one physical camera. However, the subject system may be for one or more virtual cameras and one or more physical cameras.

Figure 2:
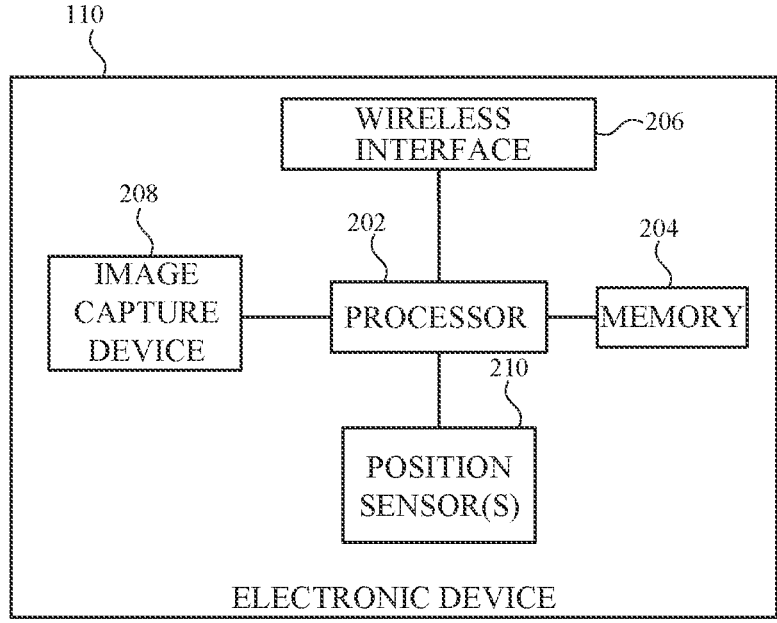
FIG. 2 illustrates an example electronic device that implement the subject system in accordance with one or more implementations.

FIG. 2 illustrates an example electronic device that implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the electronic device 105, the electronic device 112, the electronic device 115, and/or the server 120.

The electronic device 110 may include a host processor 202, a memory 204, a wireless interface 206, an image capture device 208, and one or more position sensor(s) 210. In one or more implementations, the electronic device 110 may utilize the wireless interface 206 as a position sensor and may or may not include any additional position sensors 210.

The wireless interface 206 may include one or more antennas and one or more transceivers for transmitting/receiving wireless communications. In one or more implementations, the wireless interface 206 may be configured to perform wireless ranging operations with another device, such as the electronic device 105. The wireless ranging operations may include, for example, ranging operations performed by exchanging ultra-wideband signals (e.g., 500 Mhz signals) that provide millimeter and/or sub-millimeter positioning accuracy, such as based on a time-of-arrival and/or an angle-of-arrival determined from the exchanged signals.

The image capture device 208 may be and/or may include, for example, one or more image sensors. The image capture device 208 may further include one or more illuminating devices, such as an infrared device, a light emitting diode device, or generally any illuminating device. In one or more implementations, the image capture device 208, in part and/or in whole, may be referred to as a physical camera. In one or more implementations, the image capture device 208 may be used to determine the position of the electronic device 110 relative to another device, such as the electronic device 105. For example, one or more image sensors of the image capture device 208 may be used to generate a depth map and/to otherwise determine a depth of another device, such as the electronic device 105.

In one or more implementations, the image capture device 208 may also be used to segment an image of a user's body from an image of the physical environment. For example, one or more depth maps may be generated from images captured by multiple image sensors and/or one or more depth sensors of the image capture device 208, and the one or more depth maps may be used to identify/segment objects in the images, such as the user and/or virtual content.

The one or more position sensors 210 may include one or more sensors that may provide information that can be used to determine a position of the electronic device 110, such as relative to another device (e.g., the electronic device 105). For example, the one or more position sensors may include one or more gyroscopes, accelerometers, magnetometers, ultrasound transceivers, radar/lidar transceivers, or generally any sensors that may facilitate determining the position of the electronic device 110 relative to another device, such as the electronic device 105. In one or more implementations, the one or more position sensors 210 may also be used to determine an orientation of the electronic device 110 (e.g., along an x, y, and/or z axis).

The host processor 202 may include suitable logic, circuitry, and/or code that enable processing data and/or controlling operations of the electronic device 110. In this regard, the host processor 202 may be enabled to provide control signals to various other components of the electronic device 110. The host processor 202 may also control transfers of data between various portions of the electronic device 110. Additionally, the host processor 202 may enable implementation of an operating system or otherwise execute code to manage operations of the electronic device 110. In one or more implementations, the host processor 202 may facilitate determining a position of the electronic device 110 relative to another device, such as the electronic device 105, using computer vision. For example, the host processor (and/or one or more remote processing units, such as at the server 120), may analyze one or more images captured by the image capture device 208 to determine a position of the electronic device 110 relative to another device shown in the one or more images, such as the electronic device 105.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the host processor 202, the memory 204, the wireless interface 206, the image capture device 208, the one or more position sensors 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

FIG. 3 illustrates a flow diagram of an example process 300 for synchronizing configurations between a virtual camera and a physical camera in accordance with one or more implementations. For explanatory purposes, the process 300 is primarily described herein with reference to the electronic device 110 of FIG. 1 However, the electronic device 110 is presented as an exemplary device and one or more of the operations described herein may be performed by any suitable device. For example, the process 300 may be performed by the electronic device 105, or generally any electronic device. Further for explanatory purposes, the operations of the process 300 are described herein as occurring in serial, or linearly. However, multiple operations of the process 300 may occur in parallel. In addition, the operations of the process 300 need not be performed in the order shown and/or one or more of the operations of the process 300 need not be performed and/or can be replaced by other operations.

At block 302, the electronic device 110 determines a position (e.g., location and orientation) of the physical camera, such as the electronic device 110, in the physical environment. For example, the electronic device 110 may initiate ranging operations with the physical camera, such as ultra-wideband ranging operations, when the physical camera includes a wireless interface that supports ranging operations. In one or more implementations, the electronic device 110 may utilize one or more image sensors to determine the position of the physical camera, such as by utilizing computer vision, a depth map, a reference image in a reference position in the physical environment, and/or the like. In one or more implementations, the electronic device 110 may receive (e.g., from the electronic device 105) the position of the physical camera relative to the electronic device 105. For example, the electronic device 105 may include position sensors that can be used to determine its position relative to the electronic device 110. In one or more implementations, the relative position between the electronic device 110 and the physical camera may be predetermined (e.g., when the physical camera is integrated with the electronic device 110), and, with the predetermined position, the electronic device 110 may also determine its position.

In one or more implementations, the electronic device 105 and/or the electronic device 110 may determine their individual positions relative to a reference image in the physical environment and one or more of the electronic devices 105 and/or 110 may provide the other with its position relative to the reference image. Based on their own position relative to the reference image, and the position of the other of the electronic device 105 or 110 relative to the reference image, the electronic device 105 and/or 110 can determine their position relative to one another.

At block 304, the electronic device 110 transmits the position of the physical camera to the electronic device 105. In one or more implementations when the position of the physical camera deviates from the position of the electronic device 110, the electronic device 110 may account for such deviations when transmitting the position of the physical camera to the electronic device 105. The electronic device 105 may position a virtual camera in the computer-generated reality environment in a position that coincides with the position of the physical camera of the electronic device 110 in the physical environment.

At block 306, the electronic device 110 accesses, receives, downloads, requests, or otherwise obtains metadata of the physical camera. The physical camera may be connected to and/or integrated with the electronic device 110. The metadata may include intrinsic attributes of the physical camera, such as field of view, physical zoom capabilities, and the like, and/or other characteristics of the physical camera and/or the electronic device 110, such as transmission bitrate, transmission resolution, and/or any other information relating to the configuration of the physical camera.

Additionally or alternatively, the electronic device 110 accesses, receives, downloads, requests, or otherwise obtains metadata of the virtual camera. The metadata of the virtual camera may include field of view, transmission bitrate, transmission resolution, and/or any other intrinsic attributes of the virtual camera.

At block 308, the electronic device 110 requests, signals, indicates, provides, or otherwise causes a modification of the virtual camera based on the metadata. In response, the electronic device 105 may synchronize the virtual camera within the computer-generated reality environment being provided by the electronic device 105 to modify one or more attributes of the virtual camera that coincide with the metadata of the physical camera. For example, the field of view of the virtual camera may be modified to coincide with a field of view of the physical camera such that the image frames captured by the physical camera are aligned with the virtual image frames generated by the virtual camera.

Additionally or alternatively, when the electronic device 110 has obtained the metadata of the virtual camera, the electronic device 110 may instruct, request, signal, indicate, provide, or otherwise causes a modification of the physical camera based on the metadata of the virtual camera, such as using a different lens, changing field of view and/or zoom configurations, and the like. For example, the electronic device 110 may transmit one or more instructions to the electronic device 105 directing the electronic device 105 to modify the attributes of the virtual camera so that the attributes described by the metadata of the virtual camera may align with the attributes described by the metadata of the physical camera.

At block 310, the electronic device 110 accesses, receives, downloads, requests, or otherwise obtains, from the electronic device 105, at least one virtual image frame captured by the virtual camera placed at a second position in a computer-generated environment. The second position in the computer-generate environment may coincide with the first position in the physical environment. For example, the virtual camera may be positioned (e.g., with an orientation and location) that coincides with the position (e.g., an orientation and location) of the physical camera relative to the electronic device 105 such that the image frames captured by the physical camera are position and/or perspective aligned with the virtual image frames generated by the virtual camera.

In some implementations, the electronic device 105 may render multiple virtual image frames from multiple virtual cameras, such as one or more virtual cameras from the perspective of one or more eyes of the user and/or one virtual camera from the perspective of the physical camera. Rendering multiple perspectives may offer performance efficiencies by taking advantage of the multiple rendering pipelines (e.g., for the stereoscopic presentation of the computer-generated environment) of the electronic device 105 to render the at least one virtual image frame at the second position (e.g., the physical camera's perspective). In some implementations, the electronic device 110 may also obtain, from the electronic device 105, depth information of the at least one virtual image. For example, the depth information may be a 2D frame that maps to the perspective (e.g., view frustum) of the physical camera.

In one or more implementations, the electronic device 105 may render virtual images from one virtual camera from the perspective of each eye of the user, and from a third virtual camera from the perspective of the physical camera. In one or more implementations, in order to conserve power and/or processing resources, the electronic device 105 may render virtual images from one virtual camera from the perspective of one eye of the user, and from one virtual camera from the perspective of the physical camera. Thus, the user wearing the electronic device 105 may not have a stereoscopic view of the computer-generated environment; however, the electronic device 105 only needs to render virtual images from two virtual cameras instead of three.

At block 312, the electronic device 110 accesses, receives, downloads, requests, or otherwise obtains at least one image frame captured from the physical environment from the physical camera (e.g., attached to and/or integrated with the electronic device 110). The at least one image frame may include a subject in the physical environment, such as the user wearing the electronic device 105, and/or any other person, animal, object, etc.

At block 314, the electronic device 110 renders, compiles, or otherwise generates a composite image frame including at least a portion of the virtual image frame(s) from block 310 composited with at least a portion of the image frame(s) from block 312.

In some implementations, the electronic device 110 may composite at least a portion of the image frame(s) with the virtual image frame(s) or portions thereof. The electronic device 110 may isolate one or more objects in the image frame(s) via segmentation, matting, object recognition, and/or any other computer vision technique. The isolated objects may be overlaid on the virtual image frame(s) to form composite image frame(s). For example, the composite image frame(s) may depict the user (as shown in the image frame(s)) in a computer-generated environment (as shown in the virtual image frame(s)).

In some implementations, the electronic device 110 may also or instead composite at least a portion of the virtual image frame(s) with the image frame(s) or portions thereof. The electronic device 110 may isolate one or more virtual objects in the virtual image frame(s) via segmentations, matting, object recognition, and/or any other computer vision technique. In one or more implementations, the virtual image frame(s) may only include the one or more virtual objects and/or may include the virtual objects with a transparent background and/or with a solid color background (e.g., green). The isolated virtual objects may be overlaid on the image frame(s) to form composite image frame(s). For example, the composite image frame(s) may depict the user in the physical environment (as shown in the image frame(s)) interacting with virtual objects (as shown in the virtual image frame(s)).

In one or more implementations, the virtual depth of one or more virtual objects (e.g., from the position of the virtual camera) may be compared with the physical depth of one or more overlapping physical objects in the image frame (e.g. from the position of the physical camera which coincides with the position of the virtual camera) to determine whether the one or more virtual objects should occlude the one or more physical objects, or vice versa, for generating the composite image frame.

At block 316, the electronic device 110 provides the composite image frame, such as for display to the user, for local and/or remote storage, and/or for streaming to one or more other users. One or more operations of the process 300 may be repeated for each image frame and corresponding virtual image frame to generate a composite video stream. Thus, for example, the composite image frame and/or video stream may be displayed via the electronic device 110 such that the composite video stream may be previewed in real (or near real) time and any physical and/or virtual camera adjustments may be made, for example, to adjust the framing of the physical and/or virtual cameras.

In one or more implementations, the electronic device 110 may continuously monitor the metadata of the physical camera and may continuously cause modifications of the metadata of the virtual camera to coincide with changes in the metadata of the physical camera. For example, the electronic device 110 may transmit instructions to the electronic device 105 to modify one or more intrinsic attributes of the virtual camera. Thus, if the physical camera is performing a tracking shot while changing its field of view, for example, the field of view of the virtual camera can be adaptively and/or automatically changed in response.

In one or more implementations, the electronic device 110 may continuously monitor one or more extrinsic attributes (e.g., the position and/or orientation) of the physical camera and may continuously cause modifications of one or more extrinsic attributes (e.g., the position and/or orientation) of the virtual camera to coincide with changes in the position of the physical camera. Thus, if the physical camera is performing a tracking shot, for example, the position of the virtual camera will change in response.

In one or more implementations, the electronic device 110 may determine a transmission and/or processing latency between the physical camera and the electronic device 110 and/or a transmission and/or processing latency between the electronic device 105 and the electronic device 110. To account for any differences in the latency, and thus the arrival of the image frames from the physical camera and the virtual image frames of the virtual camera, the electronic device 110 may synchronize the image frames and the virtual image frames. For example, if the image frames arrive before the virtual image frames, the electronic device 110 may place the image frames in a buffer until their corresponding virtual image frames arrive before generating the composite image frames.

In one or more implementations, the electronic device 105 and the physical camera, such as the electronic device 110, may both be associated with, and/or registered to, a same user account. The electronic device 105 and/or the electronic device 110 may confirm that the other device is associated with the same user account before initiating the example process 300. Alternatively, and/or in addition, the electronic device 105 and the electronic device 110 may be associated with different user accounts and may participate in an initial pairing/authorization operation before performing the example process 300.

FIG. 4 illustrates a flow diagram of an example process 400 for excluding occluding objects from composite image frames in accordance with one or more implementations. For explanatory purposes, the process 400 is primarily described herein with reference to the electronic device 110 of FIG. 1. However, the electronic device 110 is presented as an exemplary device and one or more of the operations described herein may be performed by any suitable device. For example, the process 400 may be performed by the electronic device 105, or generally any electronic device. Further for explanatory purposes, the operations of the process 400 are described herein as occurring in serial, or linearly However, multiple operations of the process 400 may occur in parallel. In addition, the operations of the process 400 need not be performed in the order shown and/or one or more of the operations of the process 400 need not be performed and/or can be replaced by other operations.

At block 402, the electronic device 110 determines a position (e.g., location and orientation) of the physical camera, such as the electronic device 110, relative to the electronic device 105 in the physical environment. For example, the electronic device 110 may initiate ranging operations with the physical camera, such as ultra-wideband ranging operations, when the physical camera includes a wireless interface that supports ranging operations. In one or more implementations, the electronic device 110 may utilize one or more image sensors to determine the position of the physical camera, such as by utilizing computer vision, a depth map, and/or the like. In one or more implementations, the electronic device 110 may receive (e.g., from the physical camera) the position of the physical camera relative to the electronic device 105. For example, the physical camera may include additional position sensors that can be used to determine its position relative to the electronic device 105.

At block 404, the electronic device 110 accesses, receives, downloads, requests, or otherwise obtains, from the electronic device 105, at least one virtual image frame captured by the virtual camera placed at a second position in a computer-generated environment. The second position in the computer-generated environment may coincide with the first position in the physical environment. For example, the virtual camera may be positioned (e.g., with an orientation and location) that coincides with the position (e.g., an orientation and location) of the physical camera relative to the electronic device 105 such that the image frames captured by the physical camera are aligned with the virtual image frames generated by the virtual camera.

In some implementations, the electronic device 105 may render multiple virtual image frames from multiple virtual cameras, such as one virtual camera from the perspective of the user and one virtual camera from the perspective of the physical camera. Rendering multiple perspectives may offer performance efficiencies by taking advantage of the multiple rendering pipelines (e.g., for the stereoscopic presentation of the computer-generated environment) of the electronic device 105 to render the at least one virtual image frame at the second position (e.g., the physical camera's perspective). In some implementations, the electronic device 110 may also obtain, from the electronic device 105, depth information of the at least one virtual image. For example, the depth information may be a 2D frame that maps to the perspective (e.g., view frustum) of the physical camera.

At block 406, the electronic device 110 accesses, receives, downloads, requests, or otherwise obtains at least one image frame captured from the physical environment by the physical camera (e.g., communicatively coupled to and/or integrated with the electronic device 110). The at least one image frame may include a subject in the physical environment, such as the user wearing the electronic device 105.

At block 408, the electronic device 110 determines a position of the subject in the at least one image frame. In some implementations, the subject may be the user wearing the electronic device 105, in which case the position may be the position (e.g., location and/or orientation) of the electronic device 105, and/or a position derivable from the position of the electronic device 105.

In one or more implementations, the electronic device 110 may include one or more sensors, such as multiple image sensors and/or depth sensors, that may be used to generate depth information for determining the physical depth of the subject with respect to the electronic device 110 and/or the physical camera.

At block 410, the electronic device 110 accesses, receives, downloads, requests, or otherwise obtains from the second device a position of a virtual object in the at least one virtual image frame. In one or more implementations, the position information may be transmitted in conjunction with transmission of the virtual image frame. In one or more implementations, rendering the virtual object in the at least one virtual image frame includes generating depth information associated with the virtual object that indicates the particular depth at which the virtual object is rendered.

At block 412, the electronic device 110 determine whether the subject occludes at least part of the virtual object. In some implementations, the electronic device 110 may compare the position/depth of the subject and the position/depth of the virtual object to determine whether the subject and the virtual object are overlapping and whether the subject is between the physical and/or virtual cameras and the virtual object, or vice versa.

At block 414, the electronic device 110 renders, compiles, or otherwise generates a composite image frame including at least a portion of the virtual object composited with at least a portion of the object, in response to determining that the object occludes at least part of the virtual object.

The electronic device 110 may composite at least a portion of the virtual image frame(s) with the image frame(s) or portions thereof. The electronic device 110 may isolate the virtual object in the virtual image frame(s) via segmentations, matting, object recognition, and/or any other computer vision technique. The isolated virtual object may be overlaid on the image frame(s) to form composite image frame(s). The virtual object may be masked, cropped, or otherwise hidden (fully or partially) to depict being occluded by the object.

For example, the composite image frame(s) may depict the user in the physical environment (as shown in the image frame(s)) interacting with the virtual chess board (as shown in the virtual image frame(s)) from the view of a third person behind the user. Because the user is closer to the physical camera than the virtual chess board and is in the same line of sight from the physical camera as the virtual chess board, the user is occluding the virtual chess board. Accordingly, only the portion(s) of the virtual chess board that are not occluded by the user may be composited into the composite image frame(s).

At block 412, the electronic device 110 provides the composite image frame, such as for display to the user, for local and/or remote storage, and/or for streaming to one or more other users. One or more operations of the process 400 may be repeated for each image frame and corresponding virtual image frame to generate a composite video stream. Thus, for example, the composite image frame and/or video stream may be displayed via the electronic device 110 such that the composite video stream may be previewed in real (or near real) time and any physical and/or virtual camera adjustments may be made, for example, to adjust the framing of the physical and/or virtual cameras.

Figure 5:
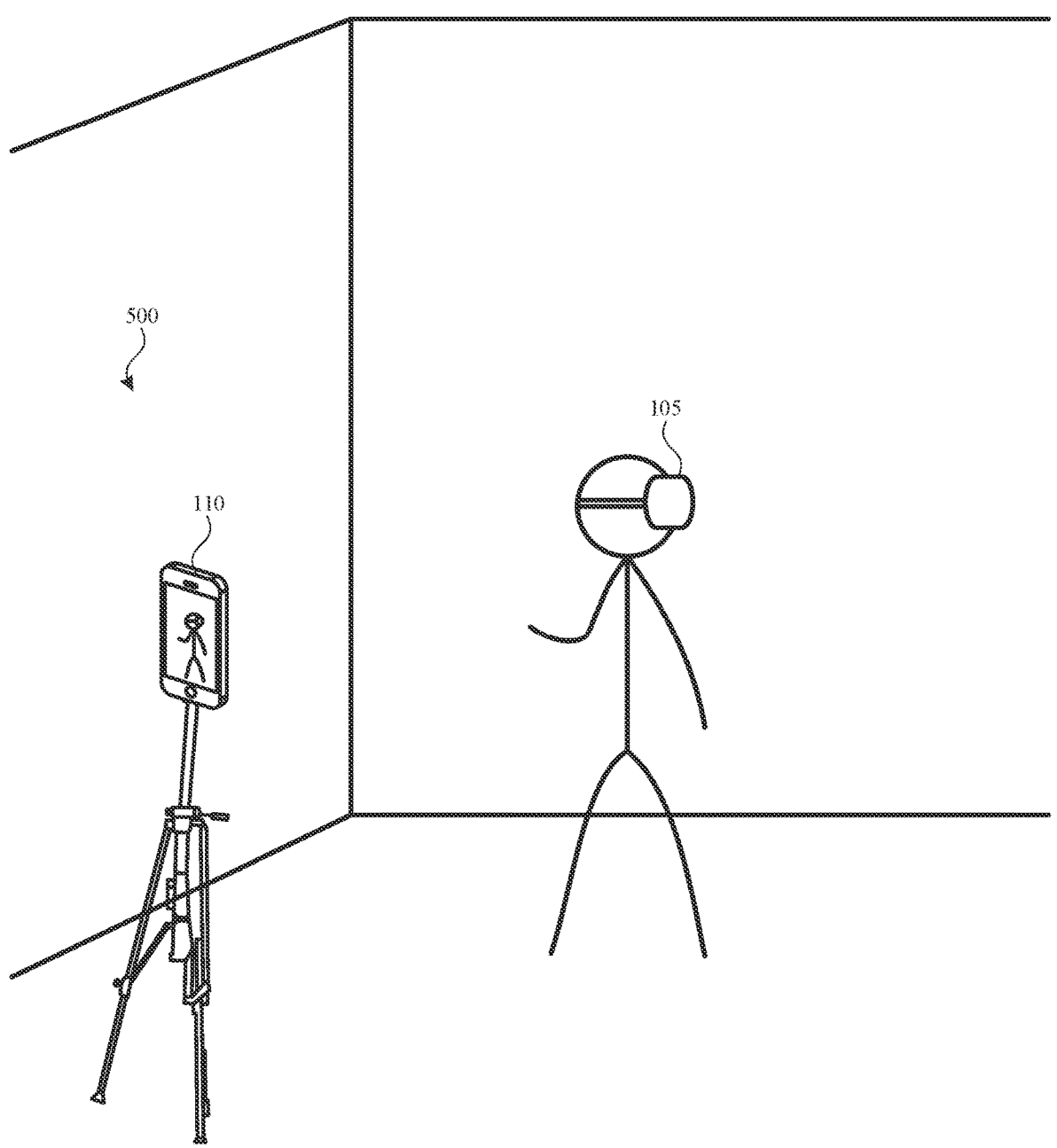
FIG. 5 illustrates an example physical environment in accordance with one or more implementations.

FIG. 5 illustrates an example physical environment 500 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example physical environment 500, the user has positioned the electronic device 110, which includes a physical camera, in a position for which the field of view of the physical camera encompasses the user using and/or wearing the electronic device 105. The electronic device 105 may then perform, for example, the process 300 described above synchronizing and/or coordinating attributes between virtual camera (e.g., the virtual camera in the computer-generated environment being provided by the electronic device 105) and physical camera (e.g., the image sensor in the electronic device 110). Additionally or alternatively, the user may have pre-configured the physical camera and the process 300 may be used to determine the appropriate attributes for the virtual camera, such as positioning, zoom level, field of view, resolution, frame rate, bitrate, and the like. Additionally or alternatively, the user may have pre-configured the virtual camera and the process 300 may be used to determine the appropriate attributes for the physical camera, such as positioning (pan, tilt, etc.), an indication of one of multiple lenses, an optical zoom level, a digital zoom level, a resolution, a frame rate, and the like.

Once the attributes of the physical camera of the electronic device 110 and the attributes of the virtual camera in the computer-generated environment being provided by the electronic device 105 are synchronized and/or coordinated, the image frames captured by the physical camera can be composited with the virtual image frames generated by the virtual camera to generate one or more computer-generated reality image frames.

In one or more implementations, the physical and virtual recordings may not occur concurrently. For example, a recording with a physical camera may be made first, and then a virtual recording may be added later, or vice versa. In this instance the attributes of the virtual and physical cameras would still be synchronized in order to allow for subsequent compositing of the recordings; however, the recordings may be made asynchronously.

In one or more implementations, the physical camera and the electronic device 110 may be separate devices that are communicatively coupled. For example, the electronic device 110 may be a computing device (e.g., a laptop computer) and the physical camera may be (e.g., a cinema camera) that is communicatively coupled (e.g., wired) to the laptop computer. The physical camera may be a predetermined distance from the electronic device 110 that is known to the electronic device 110 (e.g., the relative positioning between the physical camera and the electronic device 110 may be calculated and/or measured beforehand). This distance may be used, for example, in determining the latency between the cinema camera and the laptop computer when synchronizing the image frames from the physical camera and the virtual image frames from the virtual camera.

Figure 6:
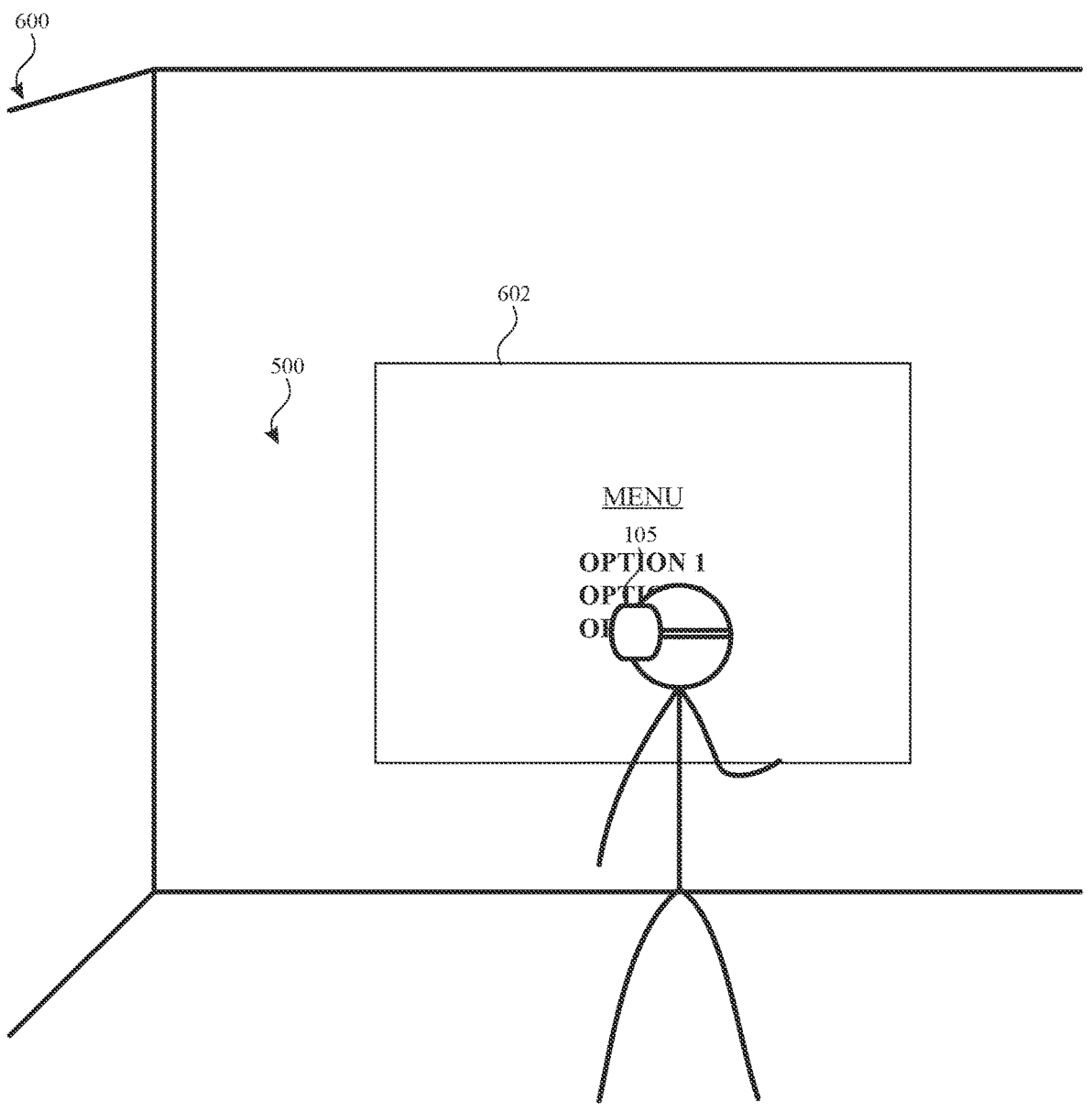
FIG. 6 illustrates the example composited augmented reality frame in accordance with one or more implementations.

FIG. 6 illustrates the example composited augmented reality frame 600 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein Additional components, different components, or fewer components may be provided.

In the example physical environment 500, from the view of the electronic device 110, the portions of the physical environment 500 that are visible to the electronic device 110 may be based on the field of view of the electronic device 110. Among the attributes that are synchronized and/or coordinated between the electronic device 110 and the electronic device 105 may include the field of view and/or other intrinsic attributes that affect the field of view of the electronic device 110 and/or the electronic device 105, such as camera focal length. Failure to synchronize such attributes may cause the resulting composite images (e.g., video frames) to appear distorted.

The field of view of the physical camera of the electronic device 110 may be matched with that of the virtual camera in the electronic device 105 to align the perspectives of the real-world content and the computer-generated content. This may be achieved by changing the rendering settings of the electronic device 110 to render content within a particular field of view. This may also or instead be achieved by causing the lens on the physical camera to zoom in or out or to change to another camera of a different focal length (e.g., in the case that the electronic device 110 has multiple physical cameras with different focal lengths).

If the physical camera moves relative to the virtual camera (e.g., panned, tilted, zoomed, and/or re-positioned in the physical environment), this change may cause the physical camera and the virtual camera to be re-synchronized (e.g., substantially instantaneously) to maintain the alignment of perspectives. For example, panning or tilting the physical camera may correspond to rotating the virtual camera in the electronic device 105. In some examples, this re-synchronizing may be done in real-time by monitoring changes in intrinsic attributes (e.g., metadata) and/or extrinsic attributes (e.g., the position) of the physical camera and communicating the changes from the electronic device 110 to the electronic device 105 to modify the virtual camera.

To handle occlusion of virtual objects (e.g., virtual object 602), depth information about the environment 500 may be gathered. The physical camera connected to the electronic device 110, and/or the electronic device 110 itself, may have sensors with depth-sensing capabilities (e.g., a lidar sensor, radar sensor, ultrasonic sensor, and the like). The depth-sensing feature may allow the electronic device 110 to understand the relative distance of objects in the scene, such as the user wearing the electronic device 105.

Additionally, depth information for the computer-generated content from the electronic device 105, such as the virtual object 602, may be provided by the electronic device 105 to the electronic device 110.

As shown in FIG. 6, the depth information from the electronic device 105 may indicate that the virtual object 602 is farther from the virtual camera than the electronic device 105 (and/or the user using the electronic device) is from the physical camera (which is positionally aligned with the virtual camera), as indicated by the depth information from the physical camera. As a result, compositing the frame 600 may include removing, covering, masking, or making transparent, part of the virtual object 602 occluded by the user wearing the electronic device 105 so that overlaying the virtual object 602 in a virtual image frame over an image frame does not result in the virtual object 602 occluding the user wearing the electronic device 105.

Figure 7:
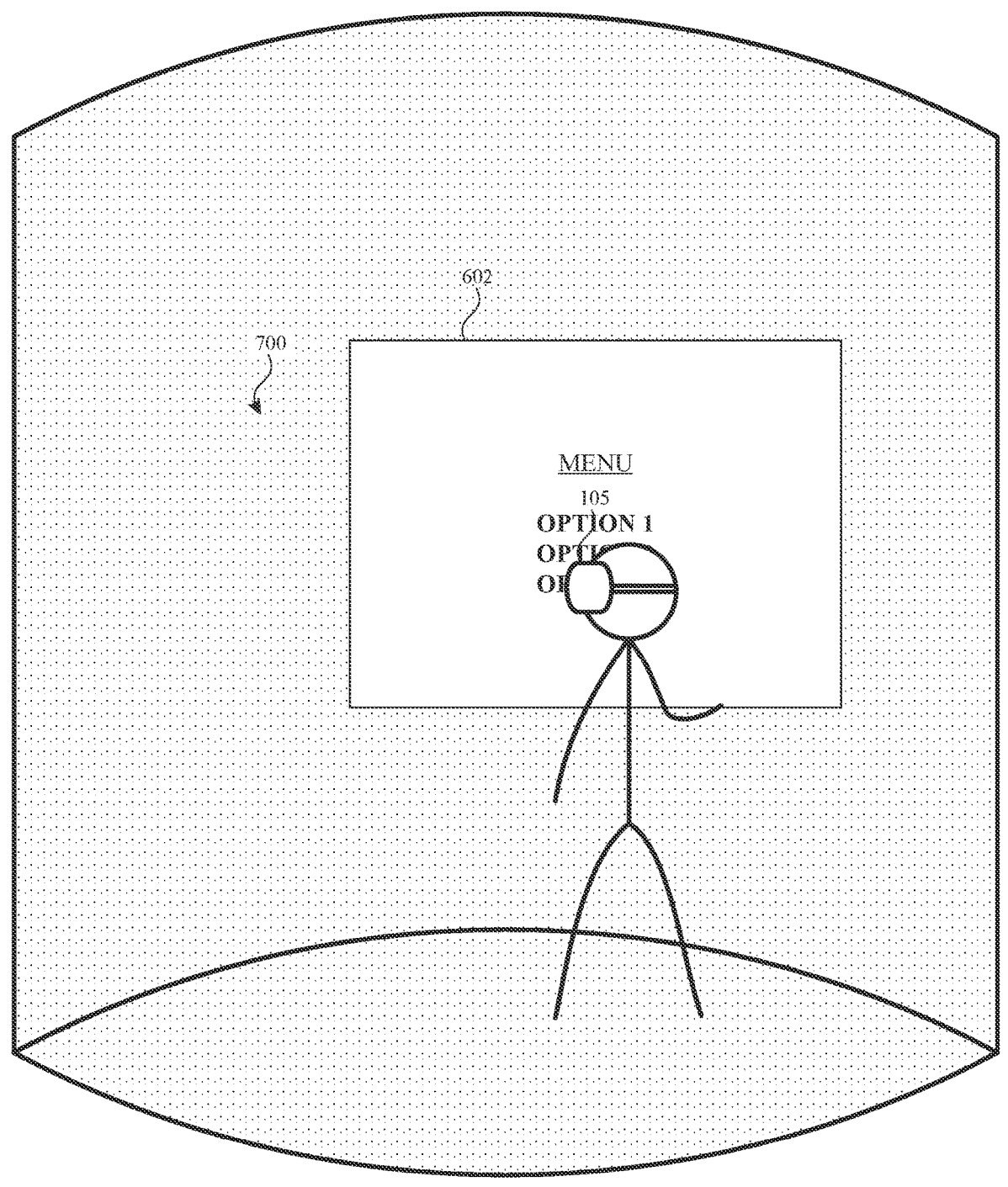
FIG. 7 illustrates an example composited virtual reality frame in accordance with one or more implementations.

FIG. 7 illustrates an example composited virtual reality image frame 700 generated by the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 7, a user is using and/or wearing the electronic device 105 to experience a computer-generated reality environment. The electronic device 110 may perform, for example, the process 300 and/or process 400 to provide another user with a composite of the computer-generated reality environment being experienced by the user using and/or wearing the electronic device 105. In one or more implementations, at least part of the image of the electronic device 105 may be removed from the computer-generated reality image frames and may be replaced with at least part of an image of the physical environment 500.

In one or more implementations, the user using and/or wearing the electronic device 105 may be experiencing a computer-generated reality environment and/or may be participating in a co-presence session with another user. The user may wish to use the physical camera on their electronic device 110 to generate a self-captured image in the computer-generated environment, which may be colloquially referred to as a "selfie."

Thus, the electronic device 105 and/or the electronic device 110 may perform the process 300 to, for example, coordinate the field of view of a virtual camera in the computer-generated environment with a field of view that complements that of the physical camera of the electronic device 110 in the physical environment. In this manner, the virtual image frame generated by the virtual camera can be composited with the image frame generated by the physical camera of the electronic device 110 to generate a mixed reality self-captured image, or a mixed reality selfie.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

FIG. 8 illustrates an example electronic system 800 with which aspects of the subject technology may be implemented in accordance with one or more implementations. The electronic system 800 can be, and/or can be a part of, one or more of the electronic device 105, the electronic device 104, the electronic device 110, the electronic device 112, the electronic device 115, and/or the server 120 shown in FIG. 1. The electronic system 800 may include various types of computer-readable media and interfaces for various other types of computer-readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a flash drive, a solid state drive, and the like) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as ASICs or FPGAs. In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device (e.g., a CRT (cathode ray tube) or LCD monitor) for displaying information to the user and a keyboard and a pointing device (e.g., a mouse or a trackball) by which the user can provide input to the computer Other kinds of devices can be used to provide for interaction with a user as well; e.g., feedback provided to the user can be any form of sensory feedback (e.g., visual feedback) auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component (e.g., as a data server), or that includes a middleware component (e.g., an application server), or that includes a front end component (e.g., a client computer having a graphical user interface or a web browser through which a user can interact with an implementation of the subject matter described in this specification), or any combination of one or more such back end, middleware, or front end components The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method comprising:

determining, by a first device, a first position of a physical camera in a physical environment;

transmitting, from the first device and to a second device, the first position;

obtaining, by the first device, metadata of the physical camera, wherein the metadata comprises one or more intrinsic attributes of the physical camera;

causing, by the first device, a modification of a virtual camera of the second device based on the metadata, wherein the causing the modification of the virtual camera comprises causing the virtual camera of the second device to move to a second position in a computer-generated environment that coincides to the first position of the physical camera from a third position corresponding to a first eye of a user of the second device;

obtaining, by the first device and from the second device, at least one virtual image frame captured by the virtual camera placed at the second position;

obtaining, by the first device and from the physical camera, at least one image frame captured from the physical environment;

generating, by the first device, a composite image frame comprising at least a portion of the at least one virtual image frame composited with at least a portion of the at least one image frame; and displaying, by the first device, the composite image frame.

2. The method of claim 1, further comprising:

detecting, by the first device, a change in the metadata of the physical camera;

transmitting, from the first device and to the second device, an indication of the change; and obtaining, by the first device and from the second device, another at least one virtual image frame of the computer-generated environment, the other at least one virtual image frame captured by the virtual camera after being modified based on the change in the metadata of the physical camera.

3. The method of claim 1, further comprising:

detecting, by the first device, a change in the first position of the physical camera in the physical environment;

transmitting, from the first device and to the second device, an indication of the change; and obtaining, by the first device and from the second device, another at least one virtual image frame of the computer-generated environment, the other at least one virtual image frame captured by the virtual camera after being re-positioned to a fourth position that reflects the change in the first position of the physical camera.

4. The method of claim 1, further comprising:

obtaining, by the first device, metadata of the virtual camera, wherein the metadata comprises one or more intrinsic attributes of the virtual camera; and causing a modification of an attribute of the physical camera based on the metadata of the virtual camera.

5. The method of claim 1, wherein the one or more intrinsic attributes comprises at least one of focal length, resolution, or bitrate.

6. The method of claim 1, wherein the first device includes the physical camera.

7. The method of claim 1, further comprising:

determining, by the first device, a first latency between the physical camera and the first device and a second latency between the second device and the first device; and synchronizing, by the first device, the at least one virtual image frame with the at least one image frame based on the first latency and the second latency.

8. The method of claim 1, wherein generating the composite image frame comprises:

segmenting at least part of a subject from the at least one image frame; and compositing the at least part of the subject with the at least one virtual image frame.

9. The method of claim 1, further comprising:

providing, to the user of the second device, one or more virtual images corresponding to another virtual camera placed at a position in the computer-generated environment that corresponds to a second eye of the user.

10. The method of claim 1, wherein causing the modification of the virtual camera of the second device based on the metadata comprises:

transmitting one or more instructions to the second device to modify one or more attributes of the virtual camera such that attributes described by the metadata of the virtual camera align with attributes described by the metadata of the physical camera.

11. A method comprising:

determining, by a first device, a first position of a physical camera relative to a second device in a physical environment;

obtaining, by the first device and from the second device, at least one virtual image frame captured by a virtual camera placed at a second position in a computer-generated environment, wherein the second position in the computer-generated environment coincides with the first position in the physical environment;

obtaining, by the first device and from the physical camera, at least one image frame captured from the physical environment, the at least one image frame including a subject in the physical environment;

determining, by the first device, a third position of the subject in the at least one image frame relative to the first position of the physical camera;

obtaining, by the first device and from the second device, a fourth position of a virtual object in the at least one virtual image frame relative to the second position of the virtual camera;

determining whether the subject occludes at least a portion of the virtual object based on the third position and the fourth position;

generating, by the first device, a composite image frame comprising the subject occluding the at least the portion of the virtual object, in response to determining that the subject occludes at least part of the virtual object; and displaying, by the first device, the composite image frame.

12. The method of claim 11, wherein the first device includes the physical camera.

13. The method of claim 11, further comprising:

determining, by the first device, a first latency between the physical camera and the first device and a second latency between the second device and the first device; and synchronizing, by the first device, the at least one virtual image frame with the at least one image frame based on the first latency and the second latency.

14. The method of claim 11, wherein generating the composite image frame comprises:

masking the at least the portion of the virtual object from the virtual object prior to generating the composite image frame.

15. The method of claim 11, wherein determining the third position of the subject in the at least one image frame comprises:

obtaining, by the first device, depth information corresponding to the at least one image frame.

16. The method of claim 15, wherein the depth information is obtained using a depth sensor of the first device.

17. The method of claim 15, wherein the depth information is derived from the at least one image frame.

18. The method of claim 11, wherein determining the fourth position of the virtual object in the at least one virtual image frame comprises:

obtaining, by the first device and from the second device, depth information corresponding to the at least one virtual image frame.

19. The method of claim 11, wherein the third position and the fourth position each include depth information.

20. A first device comprising:

a processor configured to:

determine, by the first device, a first position of a physical camera in a physical environment;

transmit, from the first device and to a second device, the first position;

obtain, by the first device, metadata of the physical camera, wherein the metadata comprises one or more intrinsic attributes of the physical camera, wherein the one or more intrinsic attributes comprises at least one of focal length, resolution, or bitrate;

cause, by the first device, a modification of a virtual camera of the second device based on the metadata;

obtain, by the first device and from the second device, at least one virtual image frame captured by the virtual camera placed at a second position in a computer-generated environment, wherein the second position in the computer-generated environment coincides with the first position in the physical environment;

obtain, by the first device and from the physical camera, at least one image frame captured from the physical environment;

generate, by the first device, a composite image frame comprising at least a portion of the at least one virtual image frame composited with at least a portion of the at least one image frame; and display, by the first device, the composite image frame.

21. The first device of claim 20, wherein the processor is further configured to:

detect, by the first device, a change in the metadata of the physical camera;

transmit, from the first device and to the second device, an indication of the change; and obtain, by the first device and from the second device, another at least one virtual image frame of the computer-generated environment, the other at least one virtual image frame captured by the virtual camera after being modified based on the change in the metadata of the physical camera.

* * * * *